United States Patent
Turgeman

(10) Patent No.: US 10,198,122 B2
(45) Date of Patent: Feb. 5, 2019

(54) SYSTEM, DEVICE, AND METHOD OF ESTIMATING FORCE APPLIED TO A TOUCH SURFACE

(71) Applicant: BioCatch Ltd., Tel Aviv (IL)

(72) Inventor: Avi Turgeman, Cambridge, MA (US)

(73) Assignee: BIOCATCH LTD., Tel Aviv (IL)

( * ) Notice: Subject to any disclaimer, the term of this patent is extended or adjusted under 35 U.S.C. 154(b) by 141 days.

(21) Appl. No.: 15/281,075

(22) Filed: Sep. 30, 2016

(65) Prior Publication Data

US 2018/0095596 A1    Apr. 5, 2018

(51) Int. Cl.
| | |
|---|---|
| G06F 3/041 | (2006.01) |
| G06F 3/0488 | (2013.01) |
| G06F 3/0346 | (2013.01) |
| G06F 3/044 | (2006.01) |
| G06F 3/043 | (2006.01) |
| G06F 3/045 | (2006.01) |

(52) U.S. Cl.
CPC .......... *G06F 3/0418* (2013.01); *G06F 3/0346* (2013.01); *G06F 3/0414* (2013.01); *G06F 3/0416* (2013.01); *G06F 3/0488* (2013.01); *G06F 3/044* (2013.01); *G06F 3/045* (2013.01); *G06F 3/0436* (2013.01)

(58) Field of Classification Search
CPC .... G06F 3/0418; G06F 3/0346; G06F 3/0414; G06F 3/0436; G06F 3/044; G06F 3/045; G06F 2203/04105; G06F 21/00; G06F 3/0416; G06F 3/0488
USPC ......................................................... 345/173
See application file for complete search history.

(56) References Cited

U.S. PATENT DOCUMENTS

| | | |
|---|---|---|
| 3,618,019 A | 11/1971 | Nemirovsky et al. |
| 3,699,517 A | 10/1972 | Dyche |
| 3,983,535 A | 9/1976 | Herbst et al. |
| 4,128,829 A | 12/1978 | Herbst et al. |
| 4,621,334 A | 11/1986 | Garcia |
| 4,760,386 A | 7/1988 | Heath et al. |
| 4,805,222 A | 2/1989 | Young et al. |

(Continued)

FOREIGN PATENT DOCUMENTS

| | | |
|---|---|---|
| EP | 2410450 | 1/2012 |
| EP | 2477136 | 7/2012 |

(Continued)

OTHER PUBLICATIONS

International Search Report application No. PCT/IB2017/055995 dated Feb. 15, 2018.

(Continued)

*Primary Examiner* — Julie Anne Watko
(74) *Attorney, Agent, or Firm* — Eitan Mehulal Sadot

(57) ABSTRACT

Devices, systems, and methods of determining or estimating a level of force or pressure, that is applied by a user to a touch surface of an electronic device or an electronic system. A touch-screen or touch-pad or other touch-sensitive surface, measures or senses a size of a touch-spot that is engaged by a fingertip of the user; and further tracks and records the changes over time in the size of such touch-spot. Based on analysis of the changes of the size of the touch-spot over time, the touch surface or an associated driver or module determines or estimates the level of force or pressure that was applied by the user, or assigns a touch-force value or class.

27 Claims, 3 Drawing Sheets

(56) References Cited

U.S. PATENT DOCUMENTS

| | | |
|---|---|---|
| 5,485,171 A | 1/1996 | Copper et al. |
| 5,557,686 A | 9/1996 | Brown et al. |
| 5,565,657 A * | 10/1996 | Merz .................. G06F 3/0414 |
| | | 178/18.01 |
| 5,838,306 A | 11/1998 | O'Connor et al. |
| 5,874,941 A | 2/1999 | Yamada |
| 6,337,686 B2 | 1/2002 | Wong et al. |
| 6,337,919 B1 | 1/2002 | Dunton |
| 6,572,014 B1 | 6/2003 | Lambert |
| 6,819,219 B1 | 11/2004 | Bolle |
| 6,938,061 B1 | 8/2005 | Rumynin et al. |
| 6,938,159 B1 | 8/2005 | O'Connor et al. |
| 6,957,185 B1 | 10/2005 | Labaton |
| 6,957,186 B1 | 10/2005 | Guheen et al. |
| 6,983,061 B2 | 1/2006 | Ikegami et al. |
| 7,130,452 B2 | 10/2006 | Bolle et al. |
| 7,133,792 B2 | 11/2006 | Murakami et al. |
| 7,139,916 B2 | 11/2006 | Billingsley et al. |
| 7,245,218 B2 | 7/2007 | Ikehara et al. |
| 7,494,061 B2 | 2/2009 | Reinhold |
| 7,523,191 B1 | 4/2009 | Thomas et al. |
| 7,606,915 B1 | 10/2009 | Calinov et al. |
| 7,796,013 B2 | 9/2010 | Murakami et al. |
| 7,818,290 B2 | 10/2010 | Davis et al. |
| 8,417,960 B2 | 4/2013 | Takahashi et al. |
| 8,433,785 B2 | 4/2013 | Awadallah et al. |
| 8,510,113 B1 | 8/2013 | Conkie et al. |
| 8,548,208 B2 | 10/2013 | Schultz |
| 9,154,534 B1 | 10/2015 | Gayles et al. |
| 9,174,123 B2 | 11/2015 | Nasiri et al. |
| 9,195,351 B1 * | 11/2015 | Rosenberg ............ G06F 1/1626 |
| 9,282,112 B2 | 3/2016 | Filatov |
| 9,301,140 B1 | 3/2016 | Costigan et al. |
| 9,304,915 B2 | 4/2016 | Adams et al. |
| 2001/0004733 A1 | 6/2001 | Eldering |
| 2002/0089412 A1 | 7/2002 | Heger et al. |
| 2003/0033526 A1 | 2/2003 | French et al. |
| 2003/0074201 A1 | 4/2003 | Grashey et al. |
| 2003/0137494 A1 * | 7/2003 | Tulbert ................. G06F 3/0423 |
| | | 345/173 |
| 2003/0212811 A1 | 11/2003 | Thornton |
| 2004/0015714 A1 | 1/2004 | Abraham et al. |
| 2004/0017355 A1 * | 1/2004 | Shim .................... G06F 3/0338 |
| | | 345/157 |
| 2004/0021643 A1 * | 2/2004 | Hoshino ................ G06F 3/016 |
| | | 345/173 |
| 2004/0062423 A1 | 4/2004 | Doi |
| 2004/0111523 A1 | 6/2004 | Hall et al. |
| 2005/0008148 A1 | 1/2005 | Jacobson |
| 2005/0179657 A1 | 8/2005 | Russo et al. |
| 2005/0289264 A1 | 12/2005 | Illowsky et al. |
| 2006/0006803 A1 | 1/2006 | Huang et al. |
| 2006/0143454 A1 | 6/2006 | Walmsley |
| 2006/0195328 A1 | 8/2006 | Abraham et al. |
| 2006/0215886 A1 | 9/2006 | Black |
| 2006/0224898 A1 | 10/2006 | Ahmed |
| 2006/0282660 A1 | 12/2006 | Varghese et al. |
| 2006/0284969 A1 | 12/2006 | Kim et al. |
| 2007/0183633 A1 | 8/2007 | Hoffmann |
| 2007/0214426 A1 | 9/2007 | Ruelle et al. |
| 2007/0255821 A1 | 11/2007 | Ge et al. |
| 2007/0266305 A1 | 11/2007 | Cong et al. |
| 2007/0271466 A1 | 11/2007 | Mak et al. |
| 2007/0283416 A1 | 12/2007 | Renaud |
| 2008/0068343 A1 * | 3/2008 | Hoshino ................ G06F 3/016 |
| | | 345/173 |
| 2008/0091639 A1 | 4/2008 | Davis et al. |
| 2008/0092209 A1 | 4/2008 | Davis et al. |
| 2008/0136790 A1 * | 6/2008 | Hio .................... G06F 3/04817 |
| | | 345/173 |
| 2008/0162449 A1 | 7/2008 | Chao-Yu et al. |
| 2008/0183745 A1 | 7/2008 | Cancel et al. |
| 2008/0211766 A1 | 9/2008 | Westerman et al. |
| 2008/0215576 A1 | 9/2008 | Zhao et al. |
| 2008/0301808 A1 | 12/2008 | Calo et al. |
| 2009/0089879 A1 | 4/2009 | Wang et al. |
| 2009/0094311 A1 | 4/2009 | Awadallah et al. |
| 2009/0189736 A1 | 7/2009 | Hayashi |
| 2009/0199296 A1 | 8/2009 | Xie et al. |
| 2009/0254336 A1 | 10/2009 | Dumais et al. |
| 2009/0293119 A1 | 11/2009 | Jonsson |
| 2009/0320123 A1 | 12/2009 | Yu et al. |
| 2010/0042403 A1 | 2/2010 | Chandrasekar et al. |
| 2010/0046806 A1 | 2/2010 | Baughman et al. |
| 2010/0077470 A1 | 3/2010 | Kozat et al. |
| 2010/0082747 A1 | 4/2010 | Yue et al. |
| 2010/0082998 A1 | 4/2010 | Kohavi |
| 2010/0122082 A1 | 5/2010 | Deng et al. |
| 2010/0125816 A1 | 5/2010 | Bezos |
| 2010/0171753 A1 * | 7/2010 | Kwon .................... G06F 1/3218 |
| | | 345/593 |
| 2010/0281539 A1 | 11/2010 | Burns et al. |
| 2010/0328074 A1 | 12/2010 | Johnson et al. |
| 2011/0012829 A1 | 1/2011 | Yao |
| 2011/0016320 A1 | 1/2011 | Bergsten et al. |
| 2011/0018828 A1 * | 1/2011 | Wu ..................... G06F 3/04883 |
| | | 345/173 |
| 2011/0023115 A1 | 1/2011 | Wright |
| 2011/0029902 A1 | 2/2011 | Bailey |
| 2011/0050394 A1 * | 3/2011 | Zhang .................... G06F 3/045 |
| | | 340/5.82 |
| 2011/0063211 A1 | 3/2011 | Hoerl et al. |
| 2011/0065504 A1 | 3/2011 | Dugan et al. |
| 2011/0102570 A1 | 5/2011 | Wilf et al. |
| 2011/0113388 A1 | 5/2011 | Eisen et al. |
| 2011/0154273 A1 | 6/2011 | Aburada et al. |
| 2011/0162076 A1 | 6/2011 | Song et al. |
| 2011/0191820 A1 | 8/2011 | Ivey |
| 2011/0193737 A1 | 8/2011 | Chiueh |
| 2011/0202453 A1 | 8/2011 | Issa et al. |
| 2011/0221684 A1 * | 9/2011 | Rydenhag ............... G06F 3/041 |
| | | 345/173 |
| 2011/0246902 A1 | 10/2011 | Tsai et al. |
| 2011/0248941 A1 * | 10/2011 | Abdo .................... G06F 3/0488 |
| | | 345/173 |
| 2011/0251823 A1 | 10/2011 | Davis et al. |
| 2011/0271342 A1 | 11/2011 | Chung et al. |
| 2011/0276414 A1 | 11/2011 | Subbarao et al. |
| 2012/0005483 A1 | 1/2012 | Patvarczki et al. |
| 2012/0007821 A1 * | 1/2012 | Zaliva ................. G06F 3/03547 |
| | | 345/173 |
| 2012/0054834 A1 | 3/2012 | King |
| 2012/0096555 A1 | 4/2012 | Mahaffey |
| 2012/0113061 A1 * | 5/2012 | Ikeda ...................... G06F 3/041 |
| | | 345/175 |
| 2012/0133055 A1 | 5/2012 | Machida |
| 2012/0154173 A1 | 6/2012 | Chang et al. |
| 2012/0154273 A1 | 6/2012 | Mcdade et al. |
| 2012/0154823 A1 | 6/2012 | Sakamoto |
| 2012/0167170 A1 | 6/2012 | Shi |
| 2012/0218193 A1 | 8/2012 | Weber et al. |
| 2012/0278804 A1 | 11/2012 | Narayanasamy et al. |
| 2013/0036416 A1 | 2/2013 | Raju et al. |
| 2013/0088434 A1 * | 4/2013 | Masuda ................. G06F 1/3262 |
| | | 345/173 |
| 2013/0097682 A1 | 4/2013 | Zeljkovic et al. |
| 2013/0097706 A1 | 4/2013 | Titonis et al. |
| 2013/0111586 A1 | 5/2013 | Jackson |
| 2013/0133055 A1 | 5/2013 | Ali et al. |
| 2013/0135218 A1 | 5/2013 | Jain |
| 2013/0154999 A1 | 6/2013 | Guard |
| 2013/0162603 A1 * | 6/2013 | Peng .................... G06F 3/0416 |
| | | 345/178 |
| 2013/0167212 A1 | 6/2013 | Azar et al. |
| 2013/0305357 A1 | 11/2013 | Ayyagari et al. |
| 2013/0335349 A1 * | 12/2013 | Ferren ................. G06K 9/3266 |
| | | 345/173 |
| 2014/0033317 A1 | 1/2014 | Barber |
| 2014/0078061 A1 | 3/2014 | Simons et al. |
| 2014/0078193 A1 | 3/2014 | Barnhoefer et al. |
| 2014/0082369 A1 | 3/2014 | Waclawsky et al. |

(56) References Cited

U.S. PATENT DOCUMENTS

| | | | |
|---|---|---|---|
| 2014/0111451 A1* | 4/2014 | Park | G06F 3/0488 345/173 |
| 2014/0143304 A1 | 5/2014 | Hegarty et al. | |
| 2014/0168093 A1* | 6/2014 | Lawrence | G06F 3/0414 345/173 |
| 2014/0196119 A1 | 7/2014 | Hill et al. | |
| 2014/0200953 A1 | 7/2014 | Mun | |
| 2014/0250538 A1 | 9/2014 | Rapaport et al. | |
| 2014/0259130 A1 | 9/2014 | Li et al. | |
| 2014/0283059 A1 | 9/2014 | Sambamurthy et al. | |
| 2014/0317734 A1 | 10/2014 | Valencia et al. | |
| 2014/0337786 A1* | 11/2014 | Luo | G06F 3/0416 715/773 |
| 2014/0344927 A1 | 11/2014 | Turgeman et al. | |
| 2015/0002479 A1* | 1/2015 | Kawamura | G06F 3/0414 345/178 |
| 2015/0012920 A1 | 1/2015 | De Santis et al. | |
| 2015/0062078 A1* | 3/2015 | Christman | G06F 3/0425 345/174 |
| 2015/0091858 A1* | 4/2015 | Rosenberg | G06F 3/0414 345/174 |
| 2015/0101031 A1 | 4/2015 | Harjanto et al. | |
| 2015/0146945 A1* | 5/2015 | Han | G06K 9/00033 382/125 |
| 2015/0213244 A1* | 7/2015 | Lymberopoulos | G06F 21/32 726/18 |
| 2015/0268768 A1* | 9/2015 | Woodhull | G06F 3/0418 345/168 |
| 2016/0006800 A1 | 1/2016 | Summers et al. | |
| 2016/0042164 A1 | 2/2016 | Goldsmith et al. | |
| 2016/0077620 A1* | 3/2016 | Choi | G06F 3/04883 345/173 |
| 2016/0109969 A1* | 4/2016 | Keating | G06F 3/03547 345/173 |
| 2016/0164905 A1 | 6/2016 | Pinney Wood et al. | |
| 2016/0164906 A1 | 6/2016 | Pinney Wood et al. | |
| 2016/0179245 A1* | 6/2016 | Johansson | G06F 3/044 345/174 |
| 2016/0209948 A1* | 7/2016 | Tulbert | G06F 3/042 |
| 2016/0364138 A1* | 12/2016 | Luo | G06F 3/04886 |
| 2017/0048272 A1 | 2/2017 | Yamamura et al. | |

FOREIGN PATENT DOCUMENTS

| | | |
|---|---|---|
| EP | 2610776 | 7/2013 |
| WO | 2007146437 | 12/2007 |
| WO | 2012073233 | 6/2012 |

OTHER PUBLICATIONS

Ahmed et al., "A New Biometric Technology Based on Mouse Dynamics", Jul.-Sep. 2007, IEEE Transactions on Dependable and Secure Computing, vol. 4, No. 3, pp. 165-179.

Bailey, Kyle O., "Computer Based Behavioral Biometric Authentication Via Multi-Modal Fusion", Thesis, 2013, Air Force Insitute of Technology.

Stinson et al., "Characterizing Bots' Remote Control Behavior". Detection of Intrusions and Malware, and Vulnerability Assessment. Springer Berlin Heidelberg, p. 89-108. Dec. 31, 2007.

Todorov, "Optimality Principles in Sensorimotor Control (Review)", Sep. 2004, Nature Neuroscience 7, pp. 907-915.

Cleeff et al., "Security Implications of Virtualization: A Literature Study", Science and Engineering, 2009.

Hibbeln et al., "Detecting Deception in Online Environments: Measuring Fraud Through Mouse Cursor Movements", Jun. 7, 2014, Gmunden Retreat on NeuroIS 2014 Gmunden Austria, p. 38.

Ferrie Peter, "Attack on Virtual Machine Emulators", Symantec Technology Exchange, 2007.

Yampolskiy et al., "Behavioural Biometrics: a survey and classification", 2008, International Journal of Biometrics, vol. 1, No. 1, pp. 81-113.

Provos et al., 2007, "The Ghost in the Browser: Analysis of Web-based Malware".

Huang Yao-Wen et al., "Web application security assessment by fault injection and behavior monitoring", 2003, Proceedings of the 12th international conference on World Wide Web, ACM.

Emmanouil Vasilomanolakis, "A honeypot-driven cyber incident monitor: Lessons learned and steps ahead"; Sep. 2015; SIN '15: Proceedings of the 8th International Conference on Security of Information and Networks; Publisher: ACM; pp. 1-7.

Franklin et al., "Remote Detection of Virtual Machine Monitors with Fuzzy benchmarking", ACM SIGOPS Operating Systems Review, V42, Issue 3, Apr. 2008.

Georgia Frantzeskou et al., "Identifying Authorship by Byte-Level N-Grams: The source Code Author Profile (SCAP) Method", Spring 2007, International Journal of Digital Evidence, vol. 6, issue 1.

Liston et al., "On the Cutting Edge: Thwarting Virtual Machine Detection"; retrieved from the Internet on May 3, 2017, from: http://docplayer.net/9791309-On-the-cutting-edge-thwarting-virtual-machine-detection.html.

Zheng et al., "An Efficient User Verification System via Mouse Movements", Oct. 17-21, 2011, CCS' 11, Chicago, Illinois.

Tavis Ormandy, "An Empirical Study into the Security Exposure to Hosts of Hostile Virtualized Environments", retrieved from the Internet on May 3, 2017, from: http://taviso.decsystem.org/virtsec.pdf.

Spafford et al., "Software Forensics: Can We Track Code to its Authors?", Feb. 1992, Computer Science Technical Report, Purdue e-Pubs, Report No. CSD-TR-92-010.

Garfinkel and Rosenblum, "A virtual Machine Introspection-Based Architecture for Intrusion Detection.", 2003, Proc. Network and Distributed Systems Security Symp., The Internet Society, pp. 191-206.

Nance et al., "Virtual Machine Introspection", IEEE Security & Privacy, 2008.

Nakkabi et al., "Improving Mouse Dynamics Biometric Performance Using Variance Reduction via Extractors with Separate Features", Nov. 2010, IEEE Transactions on System, Man, and Cybernetics; vol. 40, No. 6.

International Search Report for application PCT/IL2011/000907 dated Apr. 19, 2012.

International Search Report for application PCT/IB2014/062293 dated Oct. 1, 2014.

International Search Report for application PCT/IB2014/062941 dated Dec. 17, 2014.

International Search Report for application PCT/IB2016/054064 dated Nov. 21, 2016.

\* cited by examiner

Determination / Estimation Units 170

Force Estimator 171

Touch-Spot Size Modification Tracker 172

Velocity Estimator 173

Acceleration Estimator 174

Pressure Estimator 175

Energy Estimator 176

Change-in-Force Tracker 177

Touch-Spot Size Statistical Analyzer 178

Touch-Spot Size Min / Max Detector 179

Touch-spot Size Based User-Specific Feature(s) Extractor 180

GUI Enriching / Augmenting Unit 181

User Differentiation Module 182

Fraud Detection / Mitigation Unit 183

Fig. 1B

SYSTEM, DEVICE, AND METHOD OF ESTIMATING FORCE APPLIED TO A TOUCH SURFACE

FIELD

The present invention is related to the field of electronic devices.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

SUMMARY

Some embodiments of the present invention may comprise, for example, devices, systems, and methods for estimating or determining a force or pressure that is applied by a user who touches with a finger (or with multiple fingers) on a touch surface (e.g., a touch-screen, a multi-touch screen, a touch-pad, a projected virtual keyboard, or the like).

The present invention may provide other and/or additional benefits or advantages.

BRIEF DESCRIPTION OF THE DRAWINGS

FIG. 1B is a schematic block-diagram illustration of additional estimation and determination units of the device, in accordance with some demonstrative embodiments of the present invention.

DETAILED DESCRIPTION OF THE PRESENT INVENTION

Figure 1A:
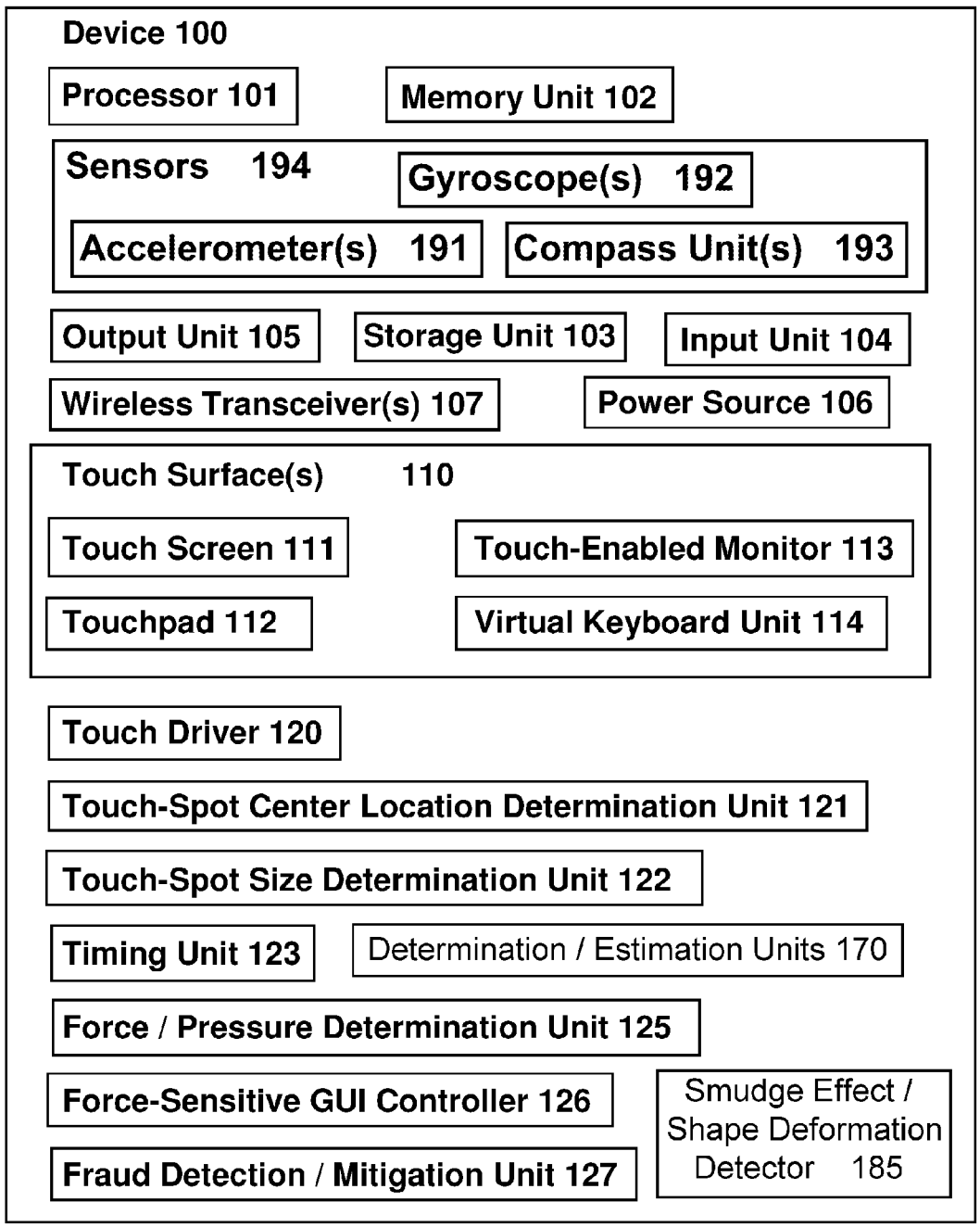
FIG. 1A is a schematic block-diagram illustration of a device, in accordance with some demonstrative embodiments of the present invention.

The Applicants have realized that many electronic devices are already equipped with a touch-screen that enables a user to provide tactile input, for example, by tapping on the screen with his finger, or by dragging his finger on the screen. Such devices include, for example, smartphone, tablet, smart-watch, laptop having a touch-screen, desktop computer connected to a touch-screen or to a touch-activated screen, or the like.

The Applicants have further realized that such electronic devices and such touch-screens are not capable of determining the force or pressure that the user applies to the touch surface, unless the entire hardware is replaced by a costly, more complicated, touch surface unit that is able to estimate the applied force or pressure.

The Applicants have realized that a hardware system, such as a "force touch" system, which attempts to estimate a force or a pressure applied to a touch-screen, requires to install and to maintain one or more dedicated hardware components, for example: a capacitive pane within or under the touch-surface; and/or a grid of thin electric wires embedded within the glass touch-surface; and/or a strain gauge, or a layer of strain-sensitive circuitry; one or more electric resistance layers, which respond to an applied pressure by becoming thinner and thus reducing their electric resistance; and/or piezo-electric sensor(s) or layer(s) which translate mechanical pressure or force or tension or compression, into electric properties.

The Applicants have realized that such conventional systems have many disadvantages. Firstly, they can be applied to newly constructed devices, but typically an already-existing conventional device cannot be readily converted or upgraded, from having a conventional touch-screen to having a force-sensitive touch screen. Secondly, the additional components and layers are costly; are complex to construct and to maintain; and they increase the weight of the device; they increase the thickness or volume or size or form-factor of the device. Thirdly, the additional components and layers operate in an imperfect manner, and particularly their performance degrades after the device falls down or is hit; for example, one or more mechanical hits to a smartphone having a force-sensitive touch-screen (e.g., such as due to a free-fall of the smartphone to the ground, or a bumping of the smartphone onto a table), cause the delicate force-sensitive touch-screen components to move or to become dislocated or to become slightly less calibrated, thereby degrading or damaging their ability to correctly estimate force.

The Applicants have realized that a conventional electronic device that already has a touch-screen that is not force sensitive, may be upgraded or modified in accordance with the present invention in order to be also force sensitive, in a manner that enables such electronic device to estimate or to determine the force or pressure that is applied to the touch-surface; without necessarily requiring to add or to modify any hardware components of the electronic device; and/or by using an already-existing configuration of the electronic device, namely by utilizing an already-existing touch-screen and its touch-gesture driver in order to further determine or estimate the applied force or pressure.

The Applicants have further realized that some embodiments of the present invention may further be useful even for newly-constructed electronic devices, in at least two ways. Firstly, a newly-constructed electronic device may utilize the components of the present invention, instead of utilizing the force sensors described above; thereby reducing the cost of the electronic device, and further reducing its form factor, volume, weight, thickness, dimensions; and further contributing to the reliability of the force estimation (e.g., non-degrading over time). Secondly, a newly-constructed electronic device, that is already manufactured to include the above-mentioned capacitance layer(s) or tension layer(s) or force sensor(s), may further benefit from utilizing an embodiment of the present invention, as a backup mechanism or as a secondary mechanism that determines force or pressure in a different manner, thereby augmenting or improving the measurements of the primary force-sensing unit, or thereby enabling the secondary force-estimating unit to operate even if the primary force-sensing unit is non-operational or if its functioning has degraded (e.g., due to mechanical shocks over time).

The Applicants have realized that a conventional touch-screen, and its associated touch driver, may be modified or augmented to extract or to measure data that may be indicative of the pressure or the force that is applied by the user.

Reference is made to FIG. 1A, which is a schematic block-diagram illustration of an electronic device 100, in accordance with some demonstrative embodiments of the present invention. Device 100 may be or may comprise, for example, a smartphone, a tablet, a smart-watch, a laptop computer, a desktop computer, or the like. Device 100 may optionally comprise one or more, or some, or all, of additional Estimation/Determination Units 170, which are further shown in greater detail in FIG. 1B, in order to prevent over-crowding of FIG. 1A.

Device 100 may comprise, for example: a processor 101 (e.g., a Central Processing Unit (CPU), a Digital Signal Processor (DSP), an Integrated Circuit (IC), or the like); a memory unit 102 (e.g., a Random Access Memory (RAM), a Flash memory, or the like); a storage unit 103 (e.g., a Flash memory, a Solid-State Drive (SSD), a Hard-Disk Drive (HDD), or the like); an input unit 104 (e.g., keyboard, mouse, touch-screen, multi-touch screen, touchpad, audio microphone); an output unit 105 (e.g., screen, display unit, monitor, audio speakers, touch-screen, multi-touch screen); a power source 106 (e.g., battery, rechargeable battery, power adapter); one or more wireless transceivers 107 (e.g., Wi-Fi transceiver, Bluetooth transceiver, ZigBee transceiver, Wi-Max transceiver); and/or other suitable components and modules. Such additional components or modules may include, for example: an Operating System (OS), one or more drivers, applications, "apps", accelerometer(s), gyroscope(s), compass unit(s), Global Positioning System (GPS) receiver or element able to determine location, device orientation sensors, device positioning sensors, barometer(s), temperature sensor(s), and/or other suitable units which are not shown in order to not over-crowd the drawing.

In a first demonstrative embodiment, device 100 is a smartphone or a tablet, and it comprises a touch-screen 111. In a second demonstrative embodiment, device 100 is a laptop computer, and it includes a touchpad 112. In a third demonstrative embodiment, device 100 is a laptop computer having a screen that is a touch-screen 111. In a fourth demonstrative embodiment, device 100 is a desktop computer, which is connected to (or associated with) a touch-enabled monitor 113 or screen or "smart-board". In a fifth demonstrative embodiment, device 100 comprises a virtual keyboard unit 114 having projector able to project a virtual keyboard or virtual keypad onto a surface (e.g., onto a table, or onto an arm of the user), and able to determine keys pressed or keys touched by using an optical sensor or camera. In a sixth embodiment, device 100 may be a vehicle, or a dashboard of a vehicle, having a touch-screen 111 enabling a driver to interact with the vehicle or with vehicular systems (e.g., vehicular mapping/navigation system; vehicular route guidance system; vehicular audio/music/entertainment system). In a seventh embodiment, device 100 may be other suitable machine, such as "kiosk" type machine, Automatic Teller Machine (ATM), vending machine, or other such machine which may comprise a touch-screen. For demonstrative purposes, units 111-114 are shown as demonstrative examples of a Touch Surface 110, which may be comprised in device 100 or may be connected to it or may be associated with it. Other types of touch surface(s) or touch-sensitive surface(s) or touch-responsive surface(s) may be used, in accordance with the present invention.

Touch Surface 110 is further associated with a Touch Driver 120, able to measure changes in properties of the touch surface 110 and able to translate or convert them into measurable values. For example, a change in the voltage at a particular region or point of the touch surface 110, due to a user gesture at that region or point, may be translated or converted by the touch driver 120 into one or more outputted values.

In a first example, Touch Surface 110 may be or may comprise a resistive system, comprising a glass panel (or other panel) that is covered with a conductive metallic layer and a resistive metallic layer. These two layers are held apart by spacers, and a scratch-resistant layer is placed on top of them. An electrical current runs through the two layers while the touch surface 110 (or the device 100) is operational. When a user touches the touch surface 110, the two layers make contact in that exact spot. The change in the electrical field is detected, and the coordinates of the point of contact are calculated. Once the coordinates are known, the touch driver translates the touch into parameter value(s), similarly to a computer mouse driver translating mouse movements into a click or a drag.

In a second example, Touch Surface 110 may be or may comprise a capacitive system, having a layer that stores electrical charge, which placed on or under the panel (e.g., the glass panel) of the touch surface 110. When a user touches the Touch Surface 110 with her finger, some of the electrical charge is transferred to the user, so the charge on the capacitive layer decreases. This decrease is measured in circuits located at each corner of the Touch Surface 110. The relative differences in charge at each corner, enable to calculate exactly where the touch event took place; and this information is relayed by the Touch Surface 110 to the Touch Driver 120.

In a third example, Touch Surface 110 may be or may comprise an acoustic wave system, having two transducers (a receiving transducer, and a sending transducer) that are placed along the X-axis and the Y-axis of the Touch Surface 110. Nearby reflectors are placed on or under or near the Touch Surface, and they reflect an electrical signal sent from one transducer to the other. The receiving transducer is able to determine whether the wave has been disturbed by a touch event at any instant, and can locate it accordingly. The wave setup lacks metallic layers on the screen or on the Touch Surface 110.

It is noted that embodiments of the present invention may be utilized with other suitable types of Touch Surface(s).

The Applicants have realized that when a finger or fingertip or skin of a user touches that the Touch Surface 110, the finger does not touch only one single pixel or a single point of the Touch Surface 110; but rather, the finger actually touches a batch of nearby pixels or points, typically having a generally-circular or generally-oval shape, which is referred here as "touch-spot".

The Applicants have further realized that the Size of such touch-spot typically increases, often in a gradual manner, as the user applies increased force or increased pressure during the touch event, and as the user performs a "smudge" or a "smear" of his fingertip which is compressed by the force applied; such that a greater size of the skin of the user becomes in contact with the Touch Surface upon application of increased force or pressure by the user.

Accordingly, the force or pressure of the touch event, can be estimated or determined in accordance with some embodiments of the invention, by measuring and analyzing the size, and the change-in-size, of the touch-spot as a function of time.

In accordance with some demonstrative embodiments of the present invention, Touch Surface 110 and/or Touch Driver 120 may comprise, or may be associated with: a touch-spot center location determination unit 121, and a touch-spot size determination unit 122. The Applicants have realized that the Touch Driver 120 may be set, or configured, or modified, to provide as output at least: the X-Y coordinates of the center of the touch-spot, via the touch-spot center location determination unit 121; and the size (e.g., the radius, or the diameter, or the area) of the touch-spot, via the touch-spot size determination unit 122.

The Applicants have realized that the changes in the touch-spot size, over time, during the press or during the gesture performed by the user on the Touch Surface 110, may be analyzed or processed in order to enable determination (or estimation) of the force applied (or the pressure applied) by the user during such press or such gesture.

In some embodiments, for example, a relatively "light" or low-force and quick "tap" of the finger on the Touch Surface, may typically yield a touch-spot having a relatively non-changing spot-size over time (e.g., over the short time that elapses from the initial contact of the finger with the Touch Surface, until the finger leaves the Touch Surface and does not touch it any more). In contrast, a high-pressure gesture of the user, is typically reflected by having an initial size of the touch-spot (e.g., initial touch-spot diameter size of 8 millimeters), which then expands and grows as the finger (or, the tip of the finger) of the user is pressed onto the Touch Surface and additional skin of the user becomes in contact with the Touch Surface; for example, having an increased touch-spot diameter size of 9 millimeters after 1 millisecond; then increasing to touch-spot diameter size of 10 millimeters after 2 milliseconds; then increasing to touch-spot diameter size of 10 millimeters after 3 milliseconds; then increasing to touch-spot diameter size of 11 millimeters after 4 milliseconds). These are only demonstrative values; other suitable values or ranges may be used or sensed.

In some embodiments, a timing unit 123 may comprise, or may be associated with, a Real Time Clock (RTC) or other timing mechanism of device 100, and may measure the time associated with the changes in the touch-spot area during the gesture. For example, the timing unit 123 may be utilized by the touch driver 120, to determine that the first, initial, touch-spot size of 8 millimeters was measured at time T0; that at time T1 being 1 millisecond later, the touch-spot size increased to 9 millimeters; that at time T2 being 1 millisecond later than T1, the touch-spot size increased to 10 millimeters; that at time T3 being 1 millisecond later than T2, the touch-spot size increased to 11 millimeters; that at time T4 being 1 millisecond later than T3, the touch-spot size increased to 12 millimeter; that then for ten consecutive milliseconds, the touch-spot size has remained at 12 millimeter; and that then, within 2 milliseconds, the touch-spot size decreased to 6 millimeters and then to zero millimeters as the fingertip was removed from the Touch Surface 110.

In a demonstrative embodiment, a buffer or a table or a list of values or a database, or other suitable data structure, may be used by the Touch Driver 120, in order to record the changes in the size of the touch-spot over time (or, as a function of time), within a particular gesture or within a single gesture; and, a force/pressure determination unit 125 may determine or estimate the force or pressure applied by the user to the touch surface 110, by analyzing such recorded data.

In a demonstrative example, reflected in Table 1 herein, the Touch Driver 120 records the following values to reflect the changes in the touch-spot size over time, and the force/pressure determination unit 125 deduces from such data that the force or pressure applied in this gestures were relatively high:

TABLE 1

| Time in Milliseconds that elapsed since the Initial Contact was sensed | Size (Diameter) in Millimeters of the Touch-Spot at this time |
| --- | --- |
| 0 milliseconds (initial contact) | 3 millimeters (initial size of touch-spot upon its initial observation) |
| 1 millisecond | 6 millimeters |
| 2 milliseconds | 9 millimeters |
| 3 milliseconds | 12 millimeters |
| 4 milliseconds | 13 millimeters |
| 5 milliseconds | 14 millimeters |
| 6 milliseconds | 15 millimeters |
| 7 milliseconds | 16 millimeters |
| 8 milliseconds | 17 millimeters |
| 9 milliseconds until 320 milliseconds | 17 millimeters (prolonged press) |
| 321 milliseconds | 17 millimeters |
| 322 milliseconds | 10 millimeters (fingertip is now leaving the Touch Surface) |
| 323 milliseconds | 5 millimeters |
| 324 milliseconds | 0 millimeters (fingertip has left the Touch Surface) |

In another demonstrative example, reflected in Table 2 herein, the Touch Driver 120 records the following values to reflect the changes in the touch-spot size over time, and the force/pressure determination unit 125 deduces from such data that the force or pressure applied in this gestures were low high:

TABLE 2

| Time in Milliseconds that elapsed since the Initial Contact was sensed | Size (Diameter) in Millimeters of the Touch-Spot at this time |
| --- | --- |
| 0 milliseconds (initial contact) | 3 millimeters (initial size of touch-spot upon its initial observation) |
| 1 millisecond | 6 millimeters |
| 2 milliseconds | 9 millimeters |
| 3 milliseconds | 9 millimeters |
| 4 milliseconds | 9 millimeters |
| 5 milliseconds until 180 milliseconds | 9 millimeters (prolonged press) |
| 181 milliseconds | 9 millimeters |
| 182 milliseconds | 5 millimeters (fingertip is now leaving the Touch Surface) |
| 183 milliseconds | 0 millimeters (fingertip has left the Touch Surface) |

Figure 2:
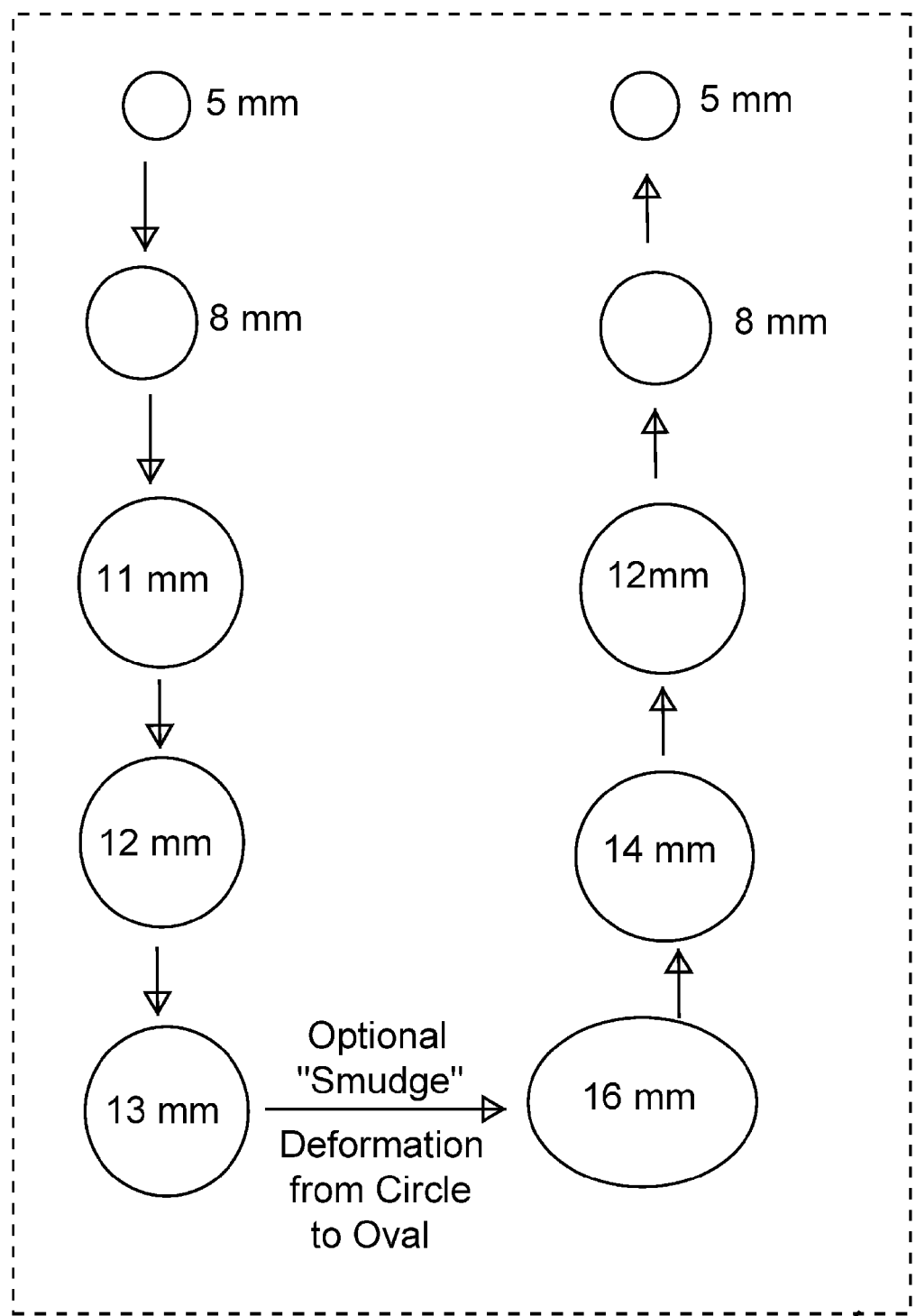
FIG. 2 is a schematic illustration of a set of stages in the size and shape of a single touch-spot measured during a single touch event on the Touch Surface, that are tracked and analyzed in accordance with some demonstrative embodiments of the present invention.

Reference is made to FIG. 2, which is a schematic illustration of a set 200 of stages in the size and shape of a single touch-spot measured during a single touch event on the Touch Surface, that are tracked and analyzed in accordance with some demonstrative embodiments of the present invention. It is clarified that the touch-spots shown in this set 200, do not appear concurrently or together on the Touch Surface; but rather, these are stages in the varying status of one single touch-spot, as it changes over time during a single touch event.

Set 200 demonstrate a "life cycle" of a touch-spot, commencing initially as a small spot (e.g., 5 mm), growing gradually in size and/or diameter; optionally, having a deformation due to a "smudge" effect (e.g., deforming from a generally-circular spot, to an oval or elliptic spot, due to "smudging" or "smearing" or compression of the fingertip on the Touch Surface); then, gradually decreased in size and/or diameter, and optionally deforming back to a generally-circular spot, until vanishing entirely once the finger completely leaves the Touch Surface. It is noted that this set 200 is only a demonstrative and non-limiting example, and other types, sizes, and/or shapes of touch-spots may be tracked, measured, and/or analyzed.

Referring again to FIGS. 1A and 1B, some embodiments may utilize a Smudge Effect/Shape Deformation Detector 185, which may detect or measure a deformation or a shape-morphing of the touch-spot e.g., from being generally circular, to being elliptic or oval, as the user "smudges" his finger into or onto the Touch Surface with increased force; and subsequently, a deformation of shape-morphing of the touch-spot from being oval or elliptic to being generally circular, as the user gradually retracts his finger away and/or reduces the compression force applied on the Touch Surface. In some embodiments, the detection of such Smudge Effect, or such shape deformation in the touch-spot, may be used (e.g., by itself; or in combination with other parameters that are measured or estimated) in order to estimate or determine the force or pressure applied, and/or in order to estimate or determine the other parameters which may be extracted or estimated.

The force/pressure determination unit 120 may utilize one or more formulae or weighting functions, or other statistical analysis functions, to determine a Force/Pressure Value associated with the entirety of the gesture on the Touch Surface. In some embodiments, the force/pressure determination unit 125 may generate a score or value or classification, that classifies the current gesture either as a "low-pressure gesture" or as a "regular-pressure gesture" or as a "high-pressure gesture"). In other embodiments, the force/pressure determination unit 125 may utilize a finer resolution of determination, and may generate for each gesture (or for each portion of a gesture, if the gesture can be broken into multiple components or strokes or sub-gestures) a Force/Pressure Score within a pre-defined range of values (e.g., a range of 1 to 100, where 1 indicates the lightest or lowest pressure, and where 100 indicates the highest pressure).

In some embodiments, the force/pressure determination unit 125 may take into account the mere growth or increase in the on-screen size of the touch-spot, over time within the gesture, as indication of the force or pressure applied by the user. For example, the force/pressure determination unit 125 may process the touch-spot size data, and may deduce that the touch-spot size remained generally constant during the entire time-period of the touch; or that the touch-spot size increased and/or decreased by no more than K percent (e.g., K being 10 or 15 or 20, or other pre-defined threshold value); and thus, due to the no-changes or the small-changes in the size of the touch-spot, little or no pressure was applied by the user during that touch event.

In contrast, the force/pressure determination unit 125 may process the touch-spot size data, and may deduce that the touch-spot size has increased and/or decreased significantly during the entire time-period of the touch; or that the touch-spot size increased and/or decreased by at least K percent (e.g., K being 21 or 25 or 30 or 33 or 50, or other pre-defined threshold value); and thus, due to the observed and significant changes of the size of the touch-spot, high pressure was applied by the user during that touch event Additionally or alternatively, the force/pressure determination unit 125 may process the touch-spot size data, and may take into account the speed or the rate or the acceleration of the changes in the size of the touch-spot, as indication for high pressure (or lack thereof). For example, a touch event in which the touch-spot reached immediately its generally-constant size, without further size increases, indicates that the user has applied regular force or low force in this touch event; whereas, in contrast, a touch event in which the touch-spot gradually increases in size over time, indicates that the user is gradually pressing his fingertip deeper and/or harder into the Touch Surface, thereby causing additional skin-areas of the fingertip to come into touch with the Touch Surface. In some embodiments, a slow acceleration in the size of the touch-spot (e.g., gradual acceleration over time), may indicate that high or higher pressure is applied gradually by the user; whereas, a low acceleration in the size of the touch-spot, may indicate that low pressure or normal pressure is applied by the user.

Additionally or alternatively, the force/pressure determination unit 125 may take into account the location of the center of the touch spot, and/or its changing over time, as measured by the touch-spot center location determination unit 121. For example, in some embodiments or for certain applications, no changes (or small changes, that are smaller than a pre-defined threshold) in the X-Y location of the center of the touch-spot, may be indicative of low pressure or low force that is applied by the user; particularly if accompanied with a short time-length of the touch event (e.g., shorter than a pre-defined time-length threshold); since this combination may indicate that a low-force short-duration touch event has occurred, lacking the "smudging" effect of a high-force touch which may cause movement of the location of the center of the touch-spot over time, and/or which may require a prolonged time-length for such high-force touch gesture. In other embodiments, or for other applications, no changes (or small changes, that are smaller than a pre-defined threshold) in the X-Y location of the center of the touch-spot, may be indicative of high pressure or high force that is applied by the user; particularly if accompanied with a long time-length of the touch event (e.g., longer than a pre-defined time-length threshold), and/or particularly if accompanied by an increase in the size of the touch-spot over time; since this combination may indicate that a high-force high-duration touch event has occurred, in which a stable "smudging" of the fingertip has occurred, without moving the fingertip away from its central location, but with changing the area of the touch-spot.

The estimation or the determination of the force or pressure, of a touch event or of a user gesture, may be used for one or more purposes by device 100. In a first embodiment, the force determination may be used as part of User Interface (UI) or Graphic UI (GUI) feedback, for example, enabling device 100 and/or its hardware and/or its software to react differently to a high-pressure touch event, or to a low-pressure touch event. For example, an application or a GUI may be programmed or configured, to perform a first operation if the user taps an on-screen button using high pressure, or to perform a second, different, operation if the user taps an on-screen button using low pressure (or normal pressure). This may be implemented, optionally, as an Operating System (OS) component or extension, or as a driver, or as part of an application or "app"; optionally utilizing a Force-Sensitive GUI Controller 126 which may define and control the manner in which GUI elements respond to various types (or levels, or values) of force or pressure applied by the user.

In another embodiment, for example, the force or pressure determination may be utilized in a manner which may be invisible or unknown to the user, as part of a security system or as part of fraud detection process. For example, device 100 may be a smartphone or a tablet, owned and typically used by its owner Adam. The owner Adam typically uses the touch-screen of the device by applying a "normal level" of force of pressure, which the force/pressure determination unit 125 may determine to be at approximately 65 (on a force scale of 1 to 100), or may be in the range of 62 to 68 (on a force scale of 1 to 100). Additionally or alternatively, a banking application installed on the device, similarly measures that the owner Adam accesses and utilizes his bank account by performing gestures and on-screen operations having the above-mentioned force level or range of force levels.

Subsequently, the device is lost or stolen, and user Bob attempts to illegally operate the device and/or attempts to operate the banking application, posing to be the device-owner Adam. However, the force/pressure determination unit 125 detects that the average or typical force of pressure during a new usage session (or, during a set of usage session), is different by at least K percent from the typical force of pressure that was observed in past usage sessions. For example, the current user (Bob) operates the device, or operates specifically the banking application through the device, with an average force of 92 (on a scale of 1 to 100), or with a force in the range of 88 to 94 (on a scale of 1 to 100); and this force value, or this range of force values, is approximately 40% greater than the historical or typical force-values (or force value range) associated with the device.

Accordingly, the device and/or the banking application may estimate or may determine that the current user (Bob) is not the legitimate device owner or the legitimate account owner (Adam), and may perform fraud mitigation operations; for example, requiring the user to enter a password or passphrase, requiring the user to authenticate by using an email account, requiring the user to answer pre-defined security questions, requiring the user to call or to visit a fraud mitigation department of the bank, or the like. Accordingly, the force values that are estimated or determined by the force/pressure determination unit 125, may be used by a fraud detection/mitigation unit 127, which may be internal to device 100, or may be external to device 100 (e.g., may reside or may be hosted in a remote server, a "cloud computing" server, a banking server, or the like).

The discussion herein with regard to estimation of Force or Pressure applied by the user, and/or with regard to determinations or estimations that are based on the Size of a touch-spot on the touch surface, are only demonstrative embodiments of the present invention; which may comprise other suitable estimations and/or determinations, based on these and/or other suitable parameters or sensed data; which may be performed by additional Determination/Estimation Units 170, which may be part of system 100, and which are shown at greater detail in FIG. 1B in order to avoid over-crowding of FIG. 1A.

For example, in a demonstrative embodiment, the finger or the fingertip of the user, that touches or otherwise interacts or engages with a Touch Surface (e.g., tap, double-tap, click, double-click, swipe motion, scroll motion, drag motion, short-term pressure or force, long or prolonged pressure or force, or the like), may be modeled as a spring-like object or a partially-flexible object, since the finger or the fingertip is not rigid, but rather has some flexibility or elasticity and/or is able to "smudge" over the Touch Surface when additional force or pressure are applied by the user.

Accordingly, the spring-like or elastic properties of the finger or fingertip, may be modeled as a spring force or elastic force, having a spring constant or elasticity constant of K; and the force (F) applied by the finger towards the Touch Surface may be expressed as:

$F = K(X2 - X1)$ where X1 and X2 represent the compression or dislocation of the fingertip (and/or the skin, and/or the fingertip muscle) along the direction of the pressured touch. This may be performed by a Force estimator 171 or other suitable unit or module.

Additionally or alternatively, the Force (F) applied by the finger may be proportional to the difference (delta S) of the touch-spot sizes (e.g., size S1 and then size S2) that can be measured (e.g., in pixels, or in millimeters) on the Touch Surface:

$\Delta S = S2 - S1$ $F \alpha (S2 - S1)$ $F \alpha \Delta S$

This may be performed by a touch-spot size modification tracker 172, in conjunction with the force estimator 171, or by other suitable unit or module.

The above may be particularly true if the spring-like constant (K) is generally similar or generally identical across all users, or across a sufficiently-large subset of the population, or among a subset of the population of users that share similar user characteristics (e.g., males of age 20 to 30; or, females of age 25 to 34).

Additionally or alternatively, the velocity (V) or the speed of the finger (or the fingertip), as it moves to press into or onto the Touch Surface, may be determined or estimated, based on the change in the measured size of the touch-spot, and/or based on the first derivative of the size of the touch-spot as a function of time (T):

$V = d(S2 - S1)/dT$

This may be performed by a Velocity estimator 173, in conjunction with one or more other units or modules.

Additionally or alternatively, since the Force (F) that is applied by the user, is generally proportional to the Acceleration (A), with M indicating the Mass, the Force may further be estimated or determined based on the derivative of the Velocity (V) as a function of time (T):

$F = MA$ $F = M * dV/dT$ $F = M * d^2(S2 - S1)/dT^2$

This may be performed by an Acceleration estimator 174, optionally in conjunction with the force estimator 171, or by other suitable unit or module Additionally or alternatively, the Pressure (P) may be defined as the Force applied per Area; and thus may be determined or estimated as:

$P = F/S2$ $P \alpha [(S2 - S1)/S2]$ $P \alpha [1 - S1/S2]$

This may be performed by a Pressure Estimator 175, in conjunction with the force estimator 171, or by other suitable unit or module Additionally or alternatively, the Energy (E) that is invested or used for the application of such pressure or force, or the intensity of the press performed, may be estimated or determined based on the Pressure (P) that was applied per time-frame (e.g., between time-point T1 and time-point T2):

$E = P/(T2 - T1)$

This may be performed by an Energy Estimator 176, in conjunction with the force estimator 171, or by other suitable unit or module Additionally or alternatively, the system may estimate, determine, track and/or monitor the change in Force (G) as a function of Time:

$$G=dF/dT$$

This may be performed by a Change-in-Force Tracker 177, in conjunction with the force estimator 171, or by other suitable unit or module Additionally or alternatively, the system may track the size of the touch-spot over time, across a large number of samples (e.g., across multiple usage sessions; across several days, or several weeks; across 100 or 500 or 1,000 touches or gestures on the Touch Surface); and may extract or determine statistical characteristics of the touch-spot sizes, for example, average value or mean value, median value, mode value or most-frequently-appearing value, maximum value (Smax), minimum value (Smin), standard deviation, variance, and/or other characteristics. In some embodiments, these features (e.g., the pair of Smin, Smax) may be indicative of the particular physiological feature(s) of the finger(s) of the particular user whose touch-spots are measured and monitored over time. This may be performed by a touch-spot size statistical analyzer module 178, and/or by a touch-spot size Min/Max detector 179, or by other suitable unit or module, for example, a touch-spot size based user-specific feature(s) extractor 180.

In some embodiments, each one of the above-mentioned parameters (for example, ΔS, V, A, F, P, E, G, the pair of (Smin, Smax), or the like), or some or all of them, or a combination of them, may be extracted or determined or estimated by the system; and may be used for one or more purposes, for example, for enriching and/or augmenting the user experience and/or the functionality of particular GUI elements (e.g., via a GUI enriching/augmenting unit 181); for differentiating or distinguishing among users (e.g., via a User Differentiation module 182); for detecting that a current user of an electronic device (or of a computerized service, or of a subscription account) is not the same user that had previously accessed that electronic device (or that computerized service, or that subscription account); for detecting or estimating fraud, fraudulent transactions, unauthorized access, unauthorized usage, illegitimate activity, or the like (e.g., via a Fraud Detection/Mitigation Unit 183); and these and/or other goals may be achieved by using a touch-screen or touch-surface.

Device 100 may further comprise one or more accelerometer(s) 191, able to sense or measure acceleration and/or deceleration and/or velocity-change and/or movement of the entirety of the device 100 (e.g., when the device 100 changes from being static or non-moving, to being moved horizontally); one or more gyroscope(s) 192, to determine device orientation and/or tilt and/or slanting and/or angular position; one or more compass unit(s) 193, to determine the direction in which device 100 is facing or is directed, as well as changes in such direction; and/or other suitable sensors 194 able to sense and/or measure changes in the spatial location or spatial properties of the device 100 (e.g., velocity, location, or the like).

Analysis of the data sensed or measured by sensors 194, may be used in order to assist or verify or fine-tune or confirm or augment the determination of force or pressure of the touch event or the touch gesture; for example, in addition to the determinations that are based on the varying size of the touch-spot, or instead of the determinations that are based on the varying size of the touch spot.

Device 100 may track its own acceleration and/or orientation before and/or during and/or after the touch event (or touch gesture), in order to fine-tune the force or pressure estimate or in order to modify such estimate or in order to generate such estimate.

In a demonstrative example, device 100 may track changes in the touch-spot size during a touch gesture; and may detect within a single touch event: (a) a first time-period, in which the size of the touch-spot is increasing; (b) a second time-period, which is immediately consecutive to the first time-period, such that in the second time-period the size of the touch-spot remains constant; (c) a third time-period, which is immediately consecutive to the second time-period, such that in the third time-period the size of the touch-spot decreases and then vanishes. The device 100 may further detect: acceleration (e.g., downwardly) of the device during the end of the first time-period and/or during the second time-period, indicating that a forceful touch is performed and it pushes and accelerates the entire device downwardly. Additionally or alternatively, the device 100 may further detect: deceleration (e.g., acceleration upwardly) of the device during the third time-period, indicating that the forceful touch has ended and the device is returning from being accelerated towards being decelerated and then coming to rest, indicating that the forceful touch has ended. Accordingly, sensing and/or measuring and/or tracking the acceleration and/or deceleration of the device, using its accelerometer(s) 191, may be used to verify or confirm a force or pressure estimation that was based on the varying size of the touch-spot; or to fine-tune or modify such estimation based on the acceleration/deceleration analysis.

In another demonstrative example, the device 100 may detect a touch event that is performed over a period of four consecutive seconds; starting with an initial appearance of a small-size touch-spot, which then increases gradually in size over one second; then remains at its maximum size for two additional seconds (optionally with a "smudge effect" that deforms the shape of the touch-spot, from circular to oval), and then decreases in size over one additional second and vanishes. In parallel, the sensors 194 of device 100 sense that during the middle two seconds, acceleration of device 100 occurs (e.g., downwardly), indicating that indeed a forceful pressure was performed during that central time-period. Additionally or alternatively, the sensors 194 of device 100 may further sense a change in device orientation during that central time-period, further supporting a determination that excess force was applied (e.g., force greater than a pre-defined threshold level). Additionally or alternatively, the sensors 194 may further sense deceleration of the device 100 (e.g., upwardly) during the last time-period (in which the touch-spot decreased in size and then vanished), further supporting the finding of ending of force application during that last time-period. Additionally or alternatively, the sensors 194 of device 100 may further sense a change in device orientation during that last time-period, such that the device 100 returns to its original pre-touch-event orientation, further supporting a determination that the applied force has ended during the third time-period. Accordingly, device acceleration data, device deceleration data, device orientation data, and/or other spatial data related to the device 100, may be used to augment or fine-tune or modify the estimation of force or pressure (or other parameters discussed above) of the touch gesture or the touch event.

In some embodiments, the acceleration/deceleration measurements may be used for determining the force or pressure of the touch gesture or the touch event, if some or all of the sampling of touch-spot size data is lost or is not-available; for example, if such data is corrupted, or if the sampling rate of the touch-spot size is slower than the manual gesture performed, or if the data transfer rate of the touch-spot size is slow; in such and/or in other scenarios, the missing data or the corrupted data may be compensated for, and force or pressure of the touch event may be estimated, based on complementing data sensed by the accelerometer(s) 191 of device 100.

The Applicants have further realized that the analysis of the varying size of the touch-spot, as well as conventional force-touch units that require an additional layer of capacitance and/or electro-mechanical membranes, may sense or may estimate the force or the pressure of a touch event only, exclusively, based on data that is collected or sensed during that touch event; and they do not take into account data that can be sensed prior to the touch event, or immediately prior to the touch event (e.g., within N milliseconds immediately prior to the touch event), or subsequent to the touch event, or immediately subsequently to the touch event (e.g., within N milliseconds immediately after the touch event).

The Applicants have realized that acceleration data, deceleration data, device orientation data, and/or other data about spatial properties of device 100, may be collected and sensed not only during the touch event, but also, prior to the touch event, or immediately prior to the touch event (e.g., within N milliseconds immediately prior to the touch event), or subsequent to the touch event, or immediately subsequently to the touch event (e.g., within N milliseconds immediately after the touch event). Such additional sensed data may further be used, in order to confirm or verify an estimate of force or pressure of the touch event, or in order to modify or fine-tune such estimate. The pre-touch-event device data, and/or the post-touch-event device data, is sensed and collected by some embodiments of the present invention; enabling the force or pressure estimates to be more accurate, and/or to be based on a longer time-period and/or to be based on a greater set of behaviors and gestures; and/or enabling the estimations to be based on a greater set of sensed data (e.g., including also pre-touch-event data, and post-touch-event data); and/or enabling to reach estimations or determinations of force or pressure based on a greater set of behavioral gestures, e.g., additional acceleration(s) and/or additional deceleration(s) and/or additional changes in device orientations, that were sensed prior to the commencement of touch event and/or after the ending of the touch event and/or during the touch event, as well as behavioral gestures that are reflected in sensed device acceleration and/or device deceleration and/or sensed device orientation data and are not necessarily reflected (entirely, or partially, or at all) in the varying sizes of the touch-spot.

In some embodiments, the sensed device acceleration and/or device deceleration and/or sensed device orientation data, may further be used to compensate for situations in which the finger or fingertip or skin of the user behave different than usual, for example, due to sweat level, due to ambient conditions (e.g., heat, cold), due to spring-like behavior of the fingertip that may be different than usual (e.g., due to physiological reasons). In contrast, the accelerometer(s) 191 and/or gyroscope(s) 192 and/or the compass unit(s) 193 may continue to operate properly, and may not necessarily be affected by such sweat level or temperature changes or fingertip-related physiological conditions. Therefore, continuous tracking of device acceleration data, device deceleration data, and device orientation data may allow the device to be less susceptible to such possible inconsistencies in the behavior of the fingertip or the skin, and may allow the system to augment the direct touch event data (e.g., size of the touch-spot) with indirect or other supporting data which may be more robust and less susceptible to inconsistencies; and further enabling the device to calibrate itself and its estimations, or to fine-tune or modify its estimations, based on data sensed by such sensors 194.

Embodiments of the present invention may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results, among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device.

In some embodiments, a method comprises: (a) determining changes over time, in a size of a touch-spot of a finger of a user during a touch event of the user on a touch surface of an electronic device; (b) based on said changes over time in the size of the touch-spot, determining a touch-force value indicative of force applied by the user on said touch surface during said touch event.

In some embodiments, the determining of step (a) comprises: (I) determining that the size of the touch-spot of the finger of the user, during the touch event on the touch surface, increases over time during a first time-slot, then remains constant during a second time-slot, then decreases over time during a third time-slot; (II) based on the determining of step (I), determining a touch-force value indicative of high force applied by the user on said touch surface during said touch event.

In some embodiments, the determining of step (a) comprises: (I) determining that the size of the touch-spot of the finger of the user, during the touch event on the touch surface, increases over time during a first time-slot, then remains constant during a second time-slot, then decreases over time during a third time-slot; wherein the second time-slot is immediately consecutive to the first time-slot; wherein the third time-slot is immediately consecutive to the second time-slot; (II) based on the determining of step (I), determining a touch-force value indicative of high force applied by the user on said touch surface during said touch event.

In some embodiments, the method comprises: (I) determining a rate-of-change of the size of the touch-spot of the finger of the user, during the touch event on the touch surface; (II) based on the rate-of-change of the size of the touch-spot, determining the touch-force value indicative of force applied by the user on said touch surface during said touch event.

In some embodiments, the method comprises: (I) determining a rate-of-change of the size of the touch-spot of the finger of the user, during the touch event on the touch surface; (II) if the rate-of-change of the size of the touch-spot of the finger, is greater than a pre-defined threshold value, then determining that a first, increased force was used to engage with the touch surface; (III) if the rate-of-change of the size of the touch-spot of the finger, is smaller than or equal to a pre-defined threshold value, then determining that a second, lower force was used to engage with the touch surface.

In some embodiments, the method comprises: (I) estimating changes over time, in an area of user fingertip that is smudged onto the touch surface during the touch event, based on changes over time in the size of the touch-spot; (II) based on said changes over time in the area of user fingertip that is smudged, determining the touch-force value indicative of force applied by the user on said touch surface during said touch event.

In some embodiments, the determining of step (b) comprises: determining the touch-force value indicative of force applied by the user on said touch surface during said touch event, based on both: (i) measured changes over time, in the size of the touch-spot of the finger of the user during the touch event of the user on the touch surface; and also (ii) measured changes over time, in a location of a center of the touch-spot of the finger of the user during the touch-event of the user on the touch surface.

In some embodiments, the method comprises: performing a first process if it is determined that a particular Graphic User Interface (GUI) element was engaged by the user at a first value of touch-force; performing a second process if it is determined that said particular GUI element was engaged by the user at a second, different, value of touch-force.

In some embodiments, the method comprises: determining that the user of the electronic device typically engages with a particular Graphic User Interface (GUI) element by applying a force having a first value of touch-force; subsequently, detecting that said particular GUI element is engaged, via said electronic device, by applying a force having a second, different, value of touch-force; based on said detecting, determining that said electronic device is utilized by a user who is not a legitimate user of said electronic device.

In some embodiments, the method comprises: (I) detecting that the touch-spot of the user, during a particular single touch event, deforms from being generally circular to being oval; (II) based on deformation in shape of the touch-spot, determining the touch-force value indicative of force applied by the user on said touch surface during said particular single touch event.

In some embodiments, the method comprises: (I) detecting that the touch-spot of the user deforms from a first shape to a second, different, shape, during a particular single touch event; (II) based on analysis of deformation in shape of the touch-spot, determining the touch-force value indicative of force applied by the user on said touch surface during said particular single touch event.

In some embodiments, the method comprises: determining the touch-force value indicative of force applied by the user on said touch surface during said particular single touch event, based on both: (i) analysis of said changes over time in the size of the touch-spot, and also (ii) device acceleration data sensed by an accelerometer of said electronic device during said touch event.

In some embodiments, the method comprises: determining the touch-force value indicative of force applied by the user on said touch surface during said particular single touch event, based on both: (i) analysis of said changes over time in the size of the touch-spot, and also (ii) device acceleration data sensed by an accelerometer of said electronic device during said touch event, and also (iii) device acceleration data sensed by an accelerometer of said electronic device immediately prior to commencement of said touch event.

In some embodiments, the method comprises: determining the touch-force value indicative of force applied by the user on said touch surface during said particular single touch event, based on both: (i) analysis of said changes over time in the size of the touch-spot, and also (ii) device acceleration data sensed by an accelerometer of said electronic device during said touch event, and also (iii) device acceleration data sensed by an accelerometer of said electronic device immediately after ending of said touch event.

In some embodiments, the method comprises: determining the touch-force value indicative of force applied by the user on said touch surface during said particular single touch event, based on both: (i) analysis of said changes over time in the size of the touch-spot, and also (ii) device orientation data sensed by a gyroscope of said electronic device during said touch event.

In some embodiments, the method comprises: determining the touch-force value indicative of force applied by the user on said touch surface during said particular single touch event, based on both: (i) analysis of said changes over time in the size of the touch-spot, and also (ii) device orientation data sensed by a gyroscope of said electronic device during said touch event, and also (iii) device orientation data sensed by said gyroscope of said electronic device immediately prior to commencement of said touch event.

In some embodiments, the method comprises: determining the touch-force value indicative of force applied by the user on said touch surface during said particular single touch event, based on both: (i) analysis of said changes over time in the size of the touch-spot, and also (ii) device orientation data sensed by a gyroscope of said electronic device during said touch event, and also (iii) device orientation data sensed by said gyroscope of said electronic device immediately after ending of said touch event.

In some embodiments, a process comprises: (a) measuring varying sizes of a touch-spot of a finger of a user during a touch event of the user on a touch surface of an electronic device; (b) based on measurements of said varying sizes of the touch-spot, determining a value indicative of the manner that said user performed said touch event on said touch surface.

In some embodiments, the process comprises: based on measurements of said varying sizes of the touch-spot, determining a value indicative of a force applied by said user towards said touch surface during said touch event.

In some embodiments, the process comprises: based on measurements of said varying sizes of the touch-spot, determining a value indicative of a pressure applied by said user towards said touch surface during said touch event.

In some embodiments, the process comprises: based on measurements of said varying sizes of the touch-spot, determining a value indicative of a velocity of fingertip compression towards said touch surface during said touch event.

In some embodiments, the process comprises: based on measurements of said varying sizes of the touch-spot, determining a value indicative of an acceleration of fingertip compression towards said touch surface during said touch event.

In some embodiments, the process comprises: based on measurements of said varying sizes of the touch-spot, determining a value indicative of an intensity of fingertip compression towards said touch surface during said touch event.

In some embodiments, the process comprises: based on measurements of said varying sizes of the touch-spot, determining a value indicative of changes in a force applied by said user towards said touch surface during said touch event.

In some embodiments, the process comprises: based on measurements of said varying sizes of the touch-spot, determining a value indicative of an energy invested by said user towards said touch surface during said touch event.

In some embodiments, the process comprises: based on measurements of said varying sizes of the touch-spot, collected over a plurality of different touch gestures, determining a pair of values indicative of maximum touch-spot size and minimum touch-spot size of said user event.

In some embodiments, the process comprises: determining a value indicative of the manner that said user performed said touch event on said touch surface, based on both: (i) analysis of measurements of said varying sizes of the touch-spot, and also (ii) device acceleration data sensed by an accelerometer of said electronic device during said touch event.

In some embodiments, the process comprises: determining a value indicative of the manner that said user performed said touch event on said touch surface, based on both: (i) analysis of measurements of said varying sizes of the touch-spot, and also (ii) device acceleration data sensed by an accelerometer of said electronic device during said touch event, and also (iii) device acceleration data sensed by an accelerometer of said electronic device immediately prior to commencement of said touch event.

In some embodiments, the process comprises: determining a value indicative of the manner that said user performed said touch event on said touch surface, based on both: (i) analysis of measurements of said varying sizes of the touch-spot, and also (ii) device acceleration data sensed by an accelerometer of said electronic device during said touch event, and also (iii) device acceleration data sensed by an accelerometer of said electronic device immediately after ending of said touch event.

In some embodiments, the process comprises: determining a value indicative of the manner that said user performed said touch event on said touch surface, based on both: (i) analysis of measurements of said varying sizes of the touch-spot, and also (ii) device orientation data sensed by a gyroscope of said electronic device during said touch event.

In some embodiments, the process comprises: determining a value indicative of the manner that said user performed said touch event on said touch surface, based on both: (i) analysis of measurements of said varying sizes of the touch-spot, and also (ii) device orientation data sensed by a gyroscope of said electronic device during said touch event, and also (iii) device orientation data sensed by the gyroscope of said electronic device immediately prior to commencement of said touch event.

In some embodiments, the process comprises: determining a value indicative of the manner that said user performed said touch event on said touch surface, based on both: (i) analysis of measurements of said varying sizes of the touch-spot, and also (ii) device orientation data sensed by a gyroscope of said electronic device during said touch event, and also (iii) device orientation data sensed by the gyroscope of said electronic device immediately after ending of said touch event.

Some embodiments comprise devices, systems, and methods of determining or estimating a level of force or pressure, that is applied by a user to a touch surface of an electronic device or an electronic system. For example, a touch-screen or touch-pad or other touch-sensitive surface, measures or senses a size of a touch-spot that is engaged by a fingertip of the user; and further tracks and records the changes over time in the size of such touch-spot. Based on analysis of the changes of the size of the touch-spot over time, the touch surface or an associated driver or module determines or estimates the level of force or pressure that was applied by the user, or assigns a touch-force value or class.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A method comprising:
   (a) determining changes over time, in a size of a touch-spot of a finger of a user during a touch event of the user on a touch surface of an electronic device;
   (b) based on said changes over time in the size of the touch-spot, determining a first derivative function of (i) said changes in the size of the touch-spot (ii) as a function of time;
   and based on said first derivative function, and while also taking into account acceleration of said electronic device as sensed by an accelerometer of said electronic device, determining one or more parameters that characterize a function of a touch-force applied by the user on said touch surface during said touch event;
   (c) determining that a first user that operated said electronic device during a first usage session, is different from a second user that operated said electronic device during a second usage session, based on a first and a second, respective, touch-force functions that are determined for said first and second, respective, usage sessions;
   wherein step (b) comprises: determining the maximum touch-force value indicative of maximum force applied by the user on said touch surface during said touch event, based on both: (i) measured changes over time, in the size of the touch-spot of the finger of the user during the touch event of the user on the touch surface; and also (ii) measured changes over time, in a location of a center of the touch-spot of the finger of the user during the touch-event of the user on the touch surface.

2. The method of claim 1, further comprising:
   performing a first operation if it is determined that a particular Graphic User Interface (GUI) element was engaged by the user at a first value of maximum touch-force;

performing a second operation if it is determined that said particular GUI element was engaged by the user at a second, different, value of maximum touch-force.

3. The method of claim 1, comprising:
determining that the user of the electronic device typically engages with a particular Graphic User Interface (GUI) element by applying a force having a first value of maximum touch-force;
subsequently, detecting that said particular GUI element is engaged, via said electronic device, by applying a force having a second, different, value of maximum touch-force;
based on said detecting, determining that said electronic device is utilized by a user who is not an authorized user of said electronic device.

4. The method of claim 1, comprising:
determining the maximum touch-force value indicative of maximum force applied by the user on said touch surface during said particular single touch event, based on both: (i) analysis of said changes over time in the size of the touch-spot, and also (ii) device acceleration data sensed by an accelerometer of said electronic device during said touch event.

5. The method of claim 1, comprising:
determining the maximum touch-force value indicative of maximum force applied by the user on said touch surface during said particular single touch event, based on: (i) analysis of said changes over time in the size of the touch-spot, and also (ii) device acceleration data sensed by an accelerometer of said electronic device during said touch event, and also (iii) device acceleration data sensed by an accelerometer of said electronic device immediately after ending of said touch event.

6. The method of claim 1, comprising:
determining the maximum touch-force value indicative of maximum force applied by the user on said touch surface during said particular single touch event, based on both: (i) analysis of said changes over time in the size of the touch-spot, and also (ii) device orientation data sensed by a gyroscope of said electronic device during said touch event.

7. The method of claim 1, comprising:
determining the maximum touch-force value indicative of maximum force applied by the user on said touch surface during said particular single touch event, based on: (i) analysis of said changes over time in the size of the touch-spot, and also (ii) device orientation data sensed by a gyroscope of said electronic device during said touch event, and also (iii) device orientation data sensed by said gyroscope of said electronic device immediately prior to commencement of said touch event.

8. The method of claim 1, comprising:
determining the maximum touch-force value indicative of maximum force applied by the user on said touch surface during said particular single touch event, based on: (i) analysis of said changes over time in the size of the touch-spot, and also (ii) device orientation data sensed by a gyroscope of said electronic device during said touch event, and also (iii) device orientation data sensed by said gyroscope of said electronic device immediately after ending of said touch event.

9. A method comprising:
(a) determining changes over time, in a size of a touch-spot of a finger of a user during a touch event of the user on a touch surface of an electronic device;
(b) based on said changes over time in the size of the touch-spot, determining a first derivative function of (i) said changes in the size of the touch-spot (ii) as a function of time;
and based on said first derivative function, and while also taking into account acceleration of said electronic device as sensed by an accelerometer of said electronic device, determining one or more parameters that characterize a function of a touch-force applied by the user on said touch surface during said touch event;
(c) determining that a first user that operated said electronic device during a first usage session, is different from a second user that operated said electronic device during a second usage session, based on a first and a second, respective, touch-force functions that are determined for said first and second, respective, usage sessions;
wherein step (b) comprises:
(I) detecting that the touch-spot of the user deforms from a first shape to a second, different, shape, during a particular single touch event;
(II) based on analysis of deformation in shape of the touch-spot, determining the maximum touch-force value indicative of maximum force applied by the user on said touch surface during said particular single touch event.

10. A method comprising:
(a) determining changes over time, in a size of a touch-spot of a finger of a user during a touch event of the user on a touch surface of an electronic device;
(b) based on said changes over time in the size of the touch-spot, determining a first derivative function of (i) said changes in the size of the touch-spot (ii) as a function of time;
and based on said first derivative function, and while also taking into account acceleration of said electronic device as sensed by an accelerometer of said electronic device, determining one or more parameters that characterize a function of a touch-force applied by the user on said touch surface during said touch event;
(c) determining that a first user that operated said electronic device during a first usage session, is different from a second user that operated said electronic device during a second usage session, based on a first and a second, respective, touch-force functions that are determined for said first and second, respective, usage sessions;
wherein step (b) comprises:
determining the maximum touch-force value indicative of maximum force applied by the user on said touch surface during said particular single touch event, based on: (i) analysis of said changes over time in the size of the touch-spot, and also (ii) device acceleration data sensed by said accelerometer of said electronic device during said touch event, and also (iii) device acceleration data sensed by said accelerometer of said electronic device immediately prior to commencement of said touch event.

11. A process comprising:
(a) measuring varying sizes of a touch-spot of a finger of a user during a touch event of the user on a touch surface of an electronic device;
(b) based on measurements of said varying sizes of the touch-spot, and based on a first derivative function of said varying sizes over time,
determining a value indicative of the way that said user performed said touch event on said touch surface;
based on measurements of said varying sizes of the touch-spot, determining a value indicative of average intensity of fingertip compression towards said touch surface during said touch event.

12. The process of claim 11, further comprising:
(I) determining a rate-of-change of the size of the touch-spot of the finger of the user, during the touch event on the touch surface;
(II) based on the rate-of-change of the size of the touch-spot, determining the maximum touch-force value indicative of force applied by the user on said touch surface during said touch event.

13. The process of claim 11, further comprising:
(I) estimating changes over time, in an area of user fingertip that is smudged onto the touch surface during the touch event, based on changes over time in the size of the touch-spot;
(II) based on said changes over time in the area of user fingertip that is smudged, determining the maximum touch-force value indicative of maximum force applied by the user on said touch surface during said touch event.

14. The process of claim 11, comprising:
(I) detecting that the touch-spot of the user, during a particular single touch event, deforms from being circular to being oval;
(II) based on deformation in shape of the touch-spot, determining the maximum touch-force value indicative of maximum force applied by the user on said touch surface during said particular single touch event.

15. The process of claim 11, comprising:
based on measurements of said varying sizes of the touch-spot, determining a value indicative of a force applied by said user towards said touch surface during said touch event.

16. The process of claim 11, comprising:
based on measurements of said varying sizes of the touch-spot, determining a value indicative of a pressure applied by said user towards said touch surface during said touch event.

17. The process of claim 11, comprising:
based on measurements of said varying sizes of the touch-spot, determining a value indicative of average velocity of fingertip compression towards said touch surface during said touch event.

18. The process of claim 11, comprising:
based on measurements of said varying sizes of the touch-spot, determining a value indicative of average acceleration of fingertip compression towards said touch surface during said touch event.

19. The process of claim 11, comprising:
based on measurements of said varying sizes of the touch-spot, determining a standard deviation value indicative of changes in a force applied by said user towards said touch surface during said touch event.

20. The process of claim 11, comprising:
based on measurements of said varying sizes of the touch-spot, determining a value indicative of total energy invested by said user towards said touch surface during said touch event.

21. The process of claim 11, comprising:
based on measurements of said varying sizes of the touch-spot, collected over a plurality of different touch gestures, determining a pair of values indicative of maximum touch-spot size and minimum touch-spot size of said touch event.

22. The process of claim 11, comprising:
determining a value indicative of the way that said user performed said touch event on said touch surface, based on both: (i) analysis of measurements of said varying sizes of the touch-spot, and also (ii) device acceleration data sensed by an accelerometer of said electronic device during said touch event.

23. The process of claim 11, comprising:
determining a value indicative of the way that said user performed said touch event on said touch surface, based on: (i) analysis of measurements of said varying sizes of the touch-spot, and also (ii) device acceleration data sensed by an accelerometer of said electronic device during said touch event, and also (iii) device acceleration data sensed by an accelerometer of said electronic device immediately prior to commencement of said touch event.

24. The process of claim 11, comprising:
determining a value indicative of the way that said user performed said touch event on said touch surface, based on: (i) analysis of measurements of said varying sizes of the touch-spot, and also (ii) device acceleration data sensed by an accelerometer of said electronic device during said touch event, and also (iii) device acceleration data sensed by an accelerometer of said electronic device immediately after ending of said touch event.

25. The process of claim 11, comprising:
determining a value indicative of the way that said user performed said touch event on said touch surface, based on both: (i) analysis of measurements of said varying sizes of the touch-spot, and also (ii) device orientation data sensed by a gyroscope of said electronic device during said touch event.

26. The process of claim 11, comprising:
determining a value indicative of the way that said user performed said touch event on said touch surface, based on: (i) analysis of measurements of said varying sizes of the touch-spot, and also (ii) device orientation data sensed by a gyroscope of said electronic device during said touch event, and also (iii) device orientation data sensed by the gyroscope of said electronic device immediately prior to commencement of said touch event.

27. The process of claim 11, comprising:
determining a value indicative of the way that said user performed said touch event on said touch surface, based on both: (i) analysis of measurements of said varying sizes of the touch-spot, and also (ii) device orientation data sensed by a gyroscope of said electronic device during said touch event, and also (iii) device orientation data sensed by the gyroscope of said electronic device immediately after ending of said touch event.

* * * * *